United States Patent [19]

Shinohara et al.

[11] 4,242,474
[45] Dec. 30, 1980

[54] PRODUCTION OF A BLOCK COPOLYMER CONTAINING HYDROPHILIC AND HYDROPHOBIC BLOCKS

[75] Inventors: Isao Shinohara; Teruo Okano; Masahisa Ikemi, all of Tokyo, Japan

[73] Assignee: Terumo Corporation, Tokyo, Japan

[21] Appl. No.: 78,209

[22] Filed: Sep. 24, 1979

[30] Foreign Application Priority Data

Oct. 4, 1978 [JP] Japan .............................. 53-122308

[51] Int. Cl.³ ...................... C08L 75/08; C08L 71/07; C08F 783/06
[52] U.S. Cl. ................... 525/404; 525/127; 525/411; 525/412; 525/454; 525/455; 525/920
[58] Field of Search ............... 525/127, 404, 411, 412, 525/454, 455

[56] References Cited

U.S. PATENT DOCUMENTS

| | | | |
|---|---|---|---|
| 3,291,859 | 12/1966 | Tobolsky | 525/412 |
| 3,919,351 | 11/1975 | Chang | 525/127 |
| 4,034,017 | 7/1977 | Chang | 525/440 |
| 4,072,770 | 2/1978 | Ting | 525/454 |
| 4,108,840 | 8/1978 | Friedlander | 525/412 |
| 4,111,769 | 9/1978 | Stueben | 204/159.23 |
| 4,129,709 | 12/1978 | Lorenz | 204/159.23 |
| 4,130,708 | 12/1978 | Friedhandler | 204/159.23 |
| 4,188,455 | 2/1980 | Howard | 204/159.23 |

*Primary Examiner*—Paul Lieberman
*Attorney, Agent, or Firm*—Bacon & Thomas

[57] ABSTRACT

A block copolymer expressed by the general formula:

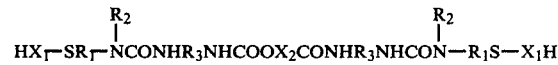

$X_1$ is a group derived from the polymerization of α-substituted acrylic acid hydroxy ester, $X_2$ is a polyoxyalkylene, $R_1$ is a divalent hydrocarbon group, $R_2$ is a hydrogen atom or methyl group, and $R_3$ is a divalent hydrocarbon-based group.

30 Claims, No Drawings

PRODUCTION OF A BLOCK COPOLYMER CONTAINING HYDROPHILIC AND HYDROPHOBIC BLOCKS

BACKGROUND OF THE INVENTION (I) Field of the Invention

This invention relates to the production of a novel type of block copolymer, and more particularly to a block copolymer whose molecule contains hydrophilic and hydrophobic blocks in a controlled amount. The invention also relates to a method of manufacturing such a block copolymer and bio-compatible materials comprising such a block copolymer.

(II) Description of the Prior Art

A polymeric material having both hydrophilic and hydrophobic properties is known as an amphiphilic polymer exhibiting a good bio-compatibility. Such polymers known to date are poly (hydroxy acrylate) and poly (hydroxy methacrylate). The typical one of such polymers is poly (2-hydroxyethyl methacrylate) commercially known as "Hydron". This substance has both hydrophilic and hydrophobic properties, because the molecule contains hydrophobic α-methyl groups and backbone (main chain), and hydrophilic hydroxyl groups located apart from the main chain. Hydron which exhibits bio-compatibility due to the above-mentioned characteristic has been attracting attention as a hopeful material particularly in a biomedical field.

However, the poly (hydroxy methacrylate) has the drawbacks that the presence of a diester inevitably contained in the starting monomer (hydroxy methacrylate) leads to the formation of a cross-linked polymer during polymerization. Thus, great difficulties are encountered in producing a linear polymer.

The customary method of manufacturing the above-mentioned poly (hydroxy methacrylate) experienced considerable difficulties in designing a molecular structure suitable for a demanded function and controlling the length of a molecular chain. As a result, poly (hydroxy methacrylate) obtained by the conventional process has been restricted in application. Development is being made for the application of the above-mentioned three-dimensional polymer to the biomedical field as a contact lens or catheter and many other fields on the basis of the water-swellability of the polymer. However, this three-dimensional polymer has a low mechanical strength, and insufficient water-swellability. Moreover, the molecules of the polymer have a low mutual adhesivity. At present, therefore, the polymer is practically applied only in a limited field.

In addition, the aforesaid three-dimensional polymer exhibits a prominent hydrophobic property due to the presence of the α-methyl groups of the side chain and the main chain or backbone and consequently is restricted in the affinity to water, though the side chain contains a hydrophilic hydroxyl group.

Generally, the important requirements for a polymer to have bio-compatibility are not only the possession of both hydrophilic and hydrophobic properties by the polymer but also the formation of microphase separated structure in which hydrophilic and hydrophobic blocks are independently aggregated and distributed. Studies conducted to date show that a biomembrance involving vascular endothelium are supposedly formed of both hydrophilic and hydrophobic domains, constituting a structure in which the microdomains are separated from each other in the level of assembly state of polymer. Thus, such structure is very important for a polymer to have bio-compatibility.

From the above-mentioned point of view, the aforesaid poly (hydroxy methacrylate) is not considered preferable. The reason for this is as follows. The hydrophilic and hydrophobic properties of poly (hydroxy methacrylate) result from the corresponding groups of the monomer in the molecular level. Therefore, the polymer itself can not be considered to have a microstructure in which microdomains are separated from each other in the level of assembly state of polymer.

From the above-mentioned circumstances, a block copolymer has come to be highlighted which is formed of different hydrophilic and hydrophobic chains bonded to each other in the polymer molecule. Due to the recent development of the so-called living anion polymerization technique, it has become possible to synthesize block copolymers having various structures with high monodispersity.

Where a monomer such as styrene is polymerized, for example, in anhydrous tetrahydrofuran with naphthyl sodium used as a polymerization initiator, then a living polymer is produced which has a stable active site (in this case, carbanion) at both chain ends and is free from termination reaction and chain transfer reaction. Addition of another monomer to the living polymer provides a block copolymer.

However, the above-mentioned method based on the living anion polymerization technique has the drawback that where styrene is replaced by hydroxy methacrylate containing a polar group such as hydroxyl group, then chain transfer reaction takes place to suppress the activity of a living anion and consequently stop the growth of molecules. In other words, the living anion polymerization technique is encountered with considerable difficulties in producing a block copolymer from hydroxyalkyl acrylate or hydroxyalkyl methacrylate.

SUMMARY OF THE INVENTION

It is accordingly an object of this invention to provide a block copolymer composed of hydrophilic and hydrophobic block chains which can form microphase separated structures in bulk state.

Another object of the invention is to provide a block copolymer with bio-compatibility and a method for manufacturing the same.

Still another object is to provide a bio-compatible medical material comprising such a block copolymer.

To attain the above-mentioned objects, this invention provides a block copolymer which contains hydrophilic and hydrophobic blocks and is expressed by the general formula:

where $R_1$ is a divalent hydrocarbon group; $R_2$ is hydrogen atom or methyl group; $R_3$ is a divalent hydrocarbon-based group; $X_1$ is a polymeric acrylic acid derivative represented by the formula:

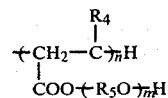

R4 is hydrogen atom or an alkyl group having 1 to 4 carbon atoms; m is an integer of 1 to 10; R5 is an alkylene group having 2 to 10 carbon atoms when m is 1 or an alkylene group having 2 to 3 carbon atoms when m is 2 to 10; n is an integer of 10 to 500; X2 is a polyalkylene oxide represented by the formula:

$$+R_7-\underset{\underset{R_6}{|}}{CH}-O\!+\!_l.$$

R6 is hydrogen atom or an alkyl group having 1 to 4 carbon atoms; R7 is an alkylene group having 1 to 3 carbon atoms; and l is an integer of 10 to 1,100.

According to this invention, the block copolymer may be produced by reacting in an organic solvent free from active hydrogen an amino-terminated polymer having an amino group at one chain end, represented by the formula:

$$H+CH_2-\underset{\underset{COO+R_5O+_{\overline{m}}H}{|}}{\overset{R_4}{\underset{|}{C}}}\!+\!_nSR_1\;\;\underset{H}{\overset{R_2}{\underset{|}{N}}} \tag{A}$$

with an isocyanate-terminated polymer having an isocyanate group at both chain ends, represented by the formula:

$$OCNR_3NHCOO+R_7-\underset{\underset{R_6}{|}}{CH}-O\!+\!_lOCNHR_3NCO \tag{B}$$

The amino-terminated polymer of formula (A) can be produced by polymerizing an α-substituted acrylic acid hydroxy ester of the formula:

$$CH_2=\underset{\underset{COO+R_5O+_{\overline{m}}H}{|}}{\overset{R_4}{C}} \tag{1}$$

using a chain transfer agent of aminothiol of the formula:

$$\underset{\underset{NH-R_1-SH}{|}}{R_2} \tag{2}$$

The isocyanate-terminated polymer of formula (B) can be prepared by reacting a polyalkylene glycol of the formula:

$$HO+R_7-\underset{\underset{R_6}{|}}{CH}-O\!+\!_lH \tag{3}$$

with a diisocyanate of the formula:

$$OCN-R_3-NCO. \tag{4}$$

In the above-mentioned formulas, R1 to R7, l, m and n are as defined previously.

There will now be detailed the starting materials of a block copolymer embodying this invention and the conditions in which said copolymer is produced.

DETAILED DESCRIPTION OF THE PREFERRED EMBODIMENTS

As mentioned above, one of the starting materials of a block copolymer embodying this invention is α-substituted acrylic acid hydroxy ester expressed by the formula (1). R4 given in the formula (1) is hydrogen atom or an alkyl group having 1 to 4 carbon atoms, preferably hydrogen atom or a methyl group. Thus, the preferred α-substituted acrylic acid hydroxy ester is a hydroxy ester of acrylic acid or methacrylic acid.

The character m shown in the structural formula (1) denotes an integer of 1 to 10. R5 is an alkylene radical having 2 to 10 or preferably 2 to 4 carbon atoms when m denotes an integer of 1, or having 2 or 3 carbon atoms when m represents an integer of 2 to 10. The character m is preferred to denote an integer of 1.

The hydroxy ester expressed by the formula (1) is produced by reacting α-substituted acrylic acid of the formula:

$$CH_2=\underset{\underset{COOH}{|}}{\overset{R_4}{C}}$$

with diol expressed by the formula:

$$HO+R_5O+_{\overline{m}}H$$

by the customary process.

The hydroxy ester of the formula (1) includes acrylic acid hydroxyalkyl esters such as 2-hydroxyethyl acrylate, 2-hydroxypropyl acrylate, 3-hydroxypropyl acrylate, 2-hydroxybutyl acrylate, 3-hydroxybutyl acrylate, 4-hydroxybutyl acrylate, 5-hydroxypentyl acrylate and 6-hydroxyhexyl acrylate; methacrylic acid hydroxyalkyl esters such as 2-hydroxyethyl methacrylate, 2-hydroxypropyl methacrylate, 3-hydroxypropyl methacrylate, 2-hydroxybutyl methacrylate, 3-hydroxybutyl methacrylate, 4-hydroxybutyl methacrylate, 5-hydroxypentyl methacrylate and 6-hydroxyhexyl methacrylate; glycol acrylic acid mono esters such as diethylene glycol monoacrylate, triethylene glycol monoacrylate, tetraethylene glycol monoacrylate, dipropylene glycol monoacrylate, tripropylene glycol monoacrylate, tetrapropylene glycol monoacrylate; and glycol methacrylic acid mono esters such as diethylene glycol monomethacrylate, triethylene glycol monomethacrylate, tetraethylene glycol monomethacrylate, dipropylene glycol monomethacrylate, tripropylene glycol monomethacrylate, and tetrapropylene glycol monomethacrylate.

The α-substituted acrylic acid hydroxy ester is polymerized using aminothiols of the formula (2) as a chain transfer agent and also using the ordinary polymerization initiator.

Aminothiols include C1 to C4 aliphatic aminothiols such as aminomethane thiol, 1-aminoethane thiol, 2-aminoethane thiol, 1-aminopropane thiol, 2-aminopropane thiol, 3-aminopropane thiol, 1-aminobutane thiol, 2-aminobutane thiol, 3-aminobutane thiol, 4-aminobutane thiol, 1-methyl-2-aminoethane thiol, and 1-methyl-1-aminoethane thiol; C5 alicyclic aminothiols such as 3-aminocyclopentadiene-1-thiol; aromatic aminothiol such as 1-aminobenzene thiol, 2-aminobenzene thiol, and 3-aminobenzene thiol; aliphatic substituted aromatic aminothiols such as 1-aminomethylbenzene thiol, 2-aminomethylbenzene thiol, 3-aminomethylbenzene thiol, 1-aminoethylbenzene thiol, 2-aminoethylbenzene thiol and 3-aminoethylbenzene thiol; and N-alkyl aminothiols such as N-methane-1-aminoethane thiol, N-methyl-2-aminoethane thiol, N-methyl-1-aminopropane thiol, N-methyl-2-aminopropane thiol, and N-methyl-3-aminopropane thiol.

Preferred aminothiols are 2-aminoethane thiol, 2-aminopropane thiol, 3-aminopropane thiol, 2-aminobutane thiol, 3-aminobutane thiol, 4-aminobutane thiol, 1-methylaminobutane thiol, and N-methyl-2-aminoethane thiol.

Polymerization initiators used in this invention include tert-butylperoctoate, benzoyl peroxide, isopropyl percarbonate, 2,4-dichlorobenzoyl peroxide, methylethylketone peroxide, cumene hydroperoxide, dicumyl peroxide, and azobisisobutyronitrile.

The α-substituted acrylic acid hydroxy ester is polymerized in an organic solvent. In this polymerization, 1 to 100 parts by weight, preferably 1.5 to 80 parts by weight of chain transfer agent is used per 100 parts by weight of α-substituted acrylic acid hydroxy ester. 0.01 to 30, preferably 0.05 to 20 parts by weight of a polymerization initiator is applied per 100 parts by weight of α-substituted acrylic acid hydroxy ester.

Organic solvents used in the polymerization include alcohols such as methanol, ethanol, n-propanol, isopropanol, n-butanol, isobutanol, and sec-butanol; glycol monoethers such as ethylene glycol monomethyl ether, ethylene glycol monoethyl ether, and ethylene glycol monobutyl ether; dimethyl formamide; dimethyl sulfoxide; hexaalkyl phosphoramide; acetonitrile; propionitrile; and benzonitrile. The above-listed organic solvents are applied in an amount of 100 to 1,000 parts by weight, preferably 150 to 500 parts by weight, per 100 parts by weight of α-substituted acrylic acid hydroxy ester.

The polymerization of the α-substituted acrylic acid hydroxy ester is conducted at a temperature of 50° to 200° C., preferably 55° to 150° C. and for 10 minutes to 30 hours, preferably 0.5 to 25 hours.

A polymer can be recovered from the polymerized reaction mixture solution by any of known procedures including taking the reacted mixture solution out of a reactor in a state condensed or just produced or in a state diluted with an organic solvent, dripping the reacted mixture solution in a poor solvent such as ethyl ether having a volume 10 to 50 times the quantity of the reacted mixture taken out of the reactor to precipitate the polymer, followed by filtration and drying. The thus produced amino-terminated polymer of formula (A) has a number average molecular weight of about 1,000 to about 40,000 or more as measured by the vapor pressure osmometry method (the latter described number average molecular weights are also measured by the same method). The above-mentioned number average molecular weight of the polymer corresponds to a number average polymerization degree of about 7 to 310 or more. The molar ratio between the α-substituted acrylic acid hydroxy ester and the chain transfer agent is proportional to a reciprocal of the polymerization degree. Therefore, the α-substituted acrylic acid hydroxy ester can be polymerized to any desired degree by properly selecting the above-mentioned molar ratio to provide a polymer whose structures is expressed by the formula (A).

The starting materials for producing an isocyanate-terminated polymer of formula (B) are polyalkylene glycols expressed by the formula (3). Typical examples include polyethylene glycol, polypropylene glycol, polybutylene glycol, polypentylene glycol and polyhexylene glycol. These polyalkylene glycols can be made into the form of any desired high monodispersity having a molecular weight ranging from 500 to 40,000 by applying reprecipitation or fractional precipitation.

The diisocyanates to be reacted with the polyalkylene glycols have a structure expressed by the formula (4). $R_3$ given in the formula (4) denotes a hydrocarbon-based group (which is a generic term for hydrocarbon groups and those containing nonhydrocarbon substituents such as a methoxy group, sulfonyl group, and halo group which do not substantially react with the polyalkylene glycols).

The diisocyanates include aliphatic diisocyanates such as ethylene diisocyanate, 1,2-propylene diisocyanate, 1,2-butylene diisocyanate, 1,3-butylene diisocyanate, 1,4-butylene diisocyanate, 2,3-butylene diisocyanate, pentamethylene diisocyanate, hexamethylene diisocyanate, and 1,10-decamethylene diisocyanate; and aromatic diisocyanates such as m-phenylene diisocyanate, p-phenylene diisocyanate, 1-chloro-2,4-phenylene diisocyanate, 2,4-tolylene diisocyanate, 2,6-tolylene diisocyanate, 3,3'-dimethyl-4,4'-biphenylene diisocyanate, 3,3'-dimethyl-4,4'-biphenylene diisocyanate, 3,3'-dimethoxy-4,4'-biphenylene diisocyanate, 2,2',5,5'-tetramethyl-4,4'-biphenylene diisocyanate, 4,4'-methylene bis(phenyl isocyanate), 4,4'-methylene bis(2-methylphenyl isocyanate), and 4,4'-sulfonyl bis(phenyl isocyanate).

Reaction between the polyalkylene glycols of formula (3) and the diisocyanates of formula (4) is carried out in an organic solvent such as chlorobenzene, toluene, xylene and benzene. In this reaction, about two isocyanate groups are applied per hydroxyl group. In other words, the reaction is carried out with the molar ratio between the diisocyanate and polyalkylene glycol set at about 2:1, and also with the overall concentration of the functional isocyanate radicals and hydroxyl groups chosen to be 0.002 to 0.20, preferably 0.01 to 0.10 M/l. The reaction is conducted at a temperature of 60° to 120° C., preferably 80° to 90° C., and for 20 to 75 hours, preferably 30 to 50 hours. The above-mentioned reaction provides a polymer expressed by the formula (B).

Since the diisocyanate reacts with hydroxyl groups of polyalkylene glycol quantitatively, the reacted mixture can be applied in the succeeding reaction in a state just produced without purifying the reaction product by reprecipitation. Therefore, the deactivation of an isocyanate group which might arise from the purifying process can be conveniently avoided.

The amino-terminated polymer of the formula (A) and the isocyanate-terminated polymer of the formula (B) are reacted together in an organic solvent free from active hydrogen such as N,N-dimethylformamide (DMF), benzene, acetone, or tetrahydrofuran (THF), with the ratio between the number of isocyanate groups and that of amino groups set at 1:1 (in other words, the molar ratio between the polymers of the formulas (B) and (A) is chosen to be about 1:2) and also with the overall concentration of the functional groups of the isocyanate groups and amino groups chosen to be 0.002 to 0.2 M/l, preferably 0.01 to 0.1 M/l. The reaction is conducted at a temperature of −10° to 15° C., preferably 0° to 10° C. and for 20 to 75 hours, preferably 30 to 50 hours.

It will be readily understood that a reaction product thus produced can be expressed by the general formula:

$$\overset{R_2}{\underset{|}{HX_l\text{-}SR_l\text{-}NCONHR_3NHCOOX_2CONHR_3NHCON}}\text{-}\overset{R_2}{\underset{|}{R_lS\text{-}X_lH}} \quad (C)$$

where $X_1$ is a polymeric α-substituted acrylic acid hydroxy ester expressed by the formula:

$$\underset{COO(R_5O)_{\overline{m}}H,}{(CH_2\text{-}\overset{R_4}{\underset{|}{C}})_{\overline{n}}} \text{ and}$$

$X_2$ is a polyalkylene oxide expressed by the formula:

$$(R_7\text{-}\overset{R_6}{\underset{|}{CH}}\text{-}O)_{\overline{l}}$$

Throughout the above structural formulas, $R_1$ to $R_7$, l, m and n are as defined previously.

The reaction product can be recovered from the reaction mixture by any optional process, for example, of taking the reaction mixture out of a reactor in a state diluted with an organic solvent, dripping the reaction mixture into a poor solvent for a block copolymer such as ethyl ether which has a volume 10 to 50 times that of the reaction mixture taken out of the reactor to precipitate the reaction product, followed by filtration and drying. The block copolymer thus produced can be purified by fractional precipitation or precipitation. The fractional precipitation process is the type which utilizes the different degrees in which the solubility of the prepolymers and that of a block copolymer depend on temperature. The reprecipitation process is the type which repeats the precipitation of the block copolymer in a solution in which each prepolymer in soluble, but the block copolymer is insoluble.

Referring to the formula (C) expressing a block copolymer, the main chain of the polymeric α-substituted acrylic acid hydroxy ester represented by $X_1$ is hydrophobic. $R_4$ given in one side chain of the formula of the α-substituted acrylic hydroxy ester is hydrophobic when denoting an alkyl group. A hydroxyl group constituting the other side chain of said structural formula is hydrophilic. The main chain of the formula of the polyalkylene oxide group represented by $X_2$ shown in the aforesaid structural formula (C) has an ether bond and is hydrophilic. $R_6$ of the side chain of the formula of said polyalkylene oxide represented by $X_2$ is hydrophobic when denoting an alkyl group. Therefore, the groups indicated by $X_1$, $X_2$ can widely vary in the degree of the hydrophilic and hydrophobic properties in accordance with the form of the side chain. For example, poly (hydroxyethyl acrylate) polymerized from hydroxyalkyl acrylate is soluble in water. But poly (hydroxyethyl methacrylate) polymerized from hydroxyalkyl methacrylate and containing an α-methyl group in the side chain is insoluble in water. Further referring to polyalkylene oxides, polyethylene oxide is soluble in water, whereas polypropylele oxide having an α-methyl group in the side chain is insoluble in water. In other words, it is possible to produce a water-soluble or water-swellable block copolymer by selecting the form of the groups represented by $X_1$, $X_2$.

Referring to a water-soluble block copolymer, the group $X_1$ having a water-insoluble chain shrinks due to its nature to avoid contact with water, indicating a compact molecular form. In contrast, the group $X_2$ having a water-soluble chain is extremely hydrophilic and has an expanded molecular form when in contact with water. When placed in a proper hydrophobic solvent, the water-soluble block copolymer indicates the opposite molecular form to that described above.

The molecular form of the above-mentioned water-soluble and water-swellable block copolymers generally widely varies with the property of a solvent used. Aggregation state of each block chain can be controlled by changing the degree of the affinity of a solvent to the respective chains. Therefore, the aforesaid block copolymers dissolved in a proper solvent and cast into a film has a structure in which microdomains having the desired degrees of hydrophilic and hydrophobic properties are separated from each other (hereinafter simply referred to as "a structure of separated microdomains"), even though the block copolymer may have the same molecular structure. Further, the structure of separated microdomains can be controlled over a broad range by applying block copolymers having various molecular structures. The above-defined structure of separated microdomains can not be controlled in the case of a blendmer.

The block copolymer whose surface has the structure of separated microdomains displays such as bio-compatibility as can not be expected from a homopolymer or random copolymer. Particularly where the subject block copolymer has a lamellar structure of about 200 to 5,000 Å having hyrophilic and hydrophobic properties or an island structure in which the hydrophilic domain constitutes the major portion of said structure, the aforesaid bio-compatibility is prominently elevated.

The block copolymer of this invention, when formed into a film, is transparent. After dissolved in a solvent, the block copolymer can be molded or cast into any desired form such as a film, plate or tube, and, after removal of the solvent, can be applied as an artificial blood vessel or skin. The structure of separated microdomains is determined in accordance with the type of solvent applied in the above-mentioned molding or casting, that is, the form of molecular chain to which the solvent shows better affinity.

A water-soluble block copolymer embodying this invention is non-ionic and applicable as a bio-compatible material such as a hemolysis inhibitor when externally circulating blood by means of an artificial heart and lungs, plasma expanded and a fractionizing agent of blood plasma components. Further, a water-soluble block copolymer embodying this invention which has highly hydrophobic chains is applicable not only as a non-ionic surface active agent of high molecular weight in carrying out emulsion polymerization and manufacturing paints and pigments, but also in the field of manufacturing medicines, perfumes and cosmetics.

The method of this invention for manufacturing a block copolymer has the advantage of designing the sizes of the hydrophilic and hydrophobic domains and the degrees of the hydrophilic and hydrophobic properties of said domains. As previously described, the chain length of the amino-terminated polymer of formula (A) is determined by the molar ratio between the monomer and chain transfer agent. The chain length of the isocyanate-terminated polymer of formula (B) is defined by selecting the molecular weight of polyoxyalkylene glycol by reprecipitation or fractional precipitation. The process of choosing the above-mentioned chain lengths can be easily carried out.

The bonding of the hydrophilic and hydrophobic chains of the subject block copolymer results from the quantitative reaction between the amino group locating at one chain end of the amino-terminated polymer of formula (A) and the isocyanate groups locating at both chain ends of the isocyanate-terminated polymer of formula (B). Reaction between said functional groups leads to the formation of a block copolymer containing hydrophilic and hydrophobic chains, which has a distinct molecular structure and can be made to have any desired property.

The method of this invention provides a molecular weight, molecular chain length and molecular chain length ratio just as designed. With the prior art polymer, the hydrophilic and hydrophobic properties are possessed by the respective molecules or monomers. In contrast, the hydrophilic and hydrophobic chains of the block copolymer of this invention can form microdomains in the level of assembly state of polymers. Therefore the present block copolymer can be applied as a material bio-compatible with a living organism.

This invention will be more fully understood by reference to the following examples.

I. PREPARATION OF ISOCYANATE-TERMINATED POLYMERS OF FORMULA (B)

EXAMPLE 1

100 g of polyethylene glycol having a number average molecular weight of 7,110 and 4,899 g of 2,4-toluene diisocyanate were dissolved in 1,556 g of chlorobenzene. The mixed solution was so adjusted that the molar ratio between the functional isocyanate group and hydroxy group indicated about 2:1, and the total concentration of these functional groups was set at 0.02 M/l. Reaction was carried out 48 hours at a temperature of 80° C.

Analysis after completion of the reaction showed that a polymer produced contained 1.96 isocyanate groups per molecule on the average and had a number average molecular weight of 7,460. The conversion was 98%. The polymer thus produced is hereinafter referred to as a "polymer A".

EXAMPLE 2

100 g of polyethylene glycol having a number average molecular weight of 500 and 60.660 g of 2,4-toluene diisocyanate were dissolved in 2,214 g of chlorobenzene. Reaction was carried out under the same conditions as in Example 1. Before the reaction, the functional groups contained in the mixed solution were made to have the same molar ratio as in Example 1, and the total concentration of the functional groups was chosen to be 0.2 M/l.

The reaction produced a polymer containing 1.98 isocyanate groups per molecule and having a number average molecular weight of 850. The conversion was 99%. The polymer thus produced is hereinafter referred to as a "polymer B".

EXAMPLE 3

100 g of polyethylene glycol having a number average molecular weight of 50,000 and 0.697 g of 2,4-toluene diisocyanate were dissolved in 2,214 g of chlorobenzene. Reaction was conducted under the same conditions as in Example 1.

Before the reaction, the functional groups were chosen to have the same molar ratio as in Example 1, and the total concentration of the functional groups was set at 0.002 M/l. The reaction produced a polymer containing two isocyanate groups per mole and having a number average molecular weight of 50,400. The conversion was 100%. The polymer thus produced is hereinafter referred to as a "polymer C".

EXAMPLE 4

100 g of polyethylene glycol having a number average molecular weight of 20,000 and 1.742 g of 2,4-toluene diisocyanate were dissolved in 2,214 g of chlorobenzene. Reaction was carried out under the same condition as in Example 1.

Before the reaction the functional groups of the mixed solution were chosen to have the same molar ratio as in Example 1, and the total concentration of the functional groups was set at 0.005 M/l. The reaction provided a polymer containing 1.96 isocyanate groups per mole and having a number average molecular weight of 20,250. The conversion was 98%. The polymer thus produced is hereinafter referred to as a "polymer D".

II. PREPARATION OF AMINO-TERMINATED POLYMERS OF FORMULA (A)

EXAMPLE 5

A polymerization tube was filled with 100 g of 2-hydroxyethyl methacrylate, 0.252 g of α-α'-azobisisobutyronitrile, 41.50 g of 2-aminoethane thiol and 290.3 g of N-dimethylformamide. The polymerization tube containing the charged materials were sealed in vacuum. Reaction was continued for 8.5 hours with stirring in a thermostatic bath maintained at a temperature of 60° C.

Upon completion of the reaction, the reaction mixture was diluted with acetone. After taken out of the polymerization tube, the diluted reaction mixture was dripped into a solvent of ethyl ether having a volume 20 times that of the reaction mixture to precipitate the polymer, followed by filtration and vacuum drying. As a result, a polymer containing 1 mol of an amino group per molecule and having a number average molecular weight of 2,640 was obtained with a yield of 21.50%. The polymer thus produced is hereinafter referred to as a "polymer E".

EXAMPLE 6

Reaction and purification were carried out under the same conditions as in Example 5, except that 26.68 g of 2-aminoethane thiol was applied and reaction was continued for 5 hours. A polymer having a number average molecular weight of 5,200 was produced with a yield of 19.20%. The polymer thus produced is hereinafter referred to as a "polymer F".

EXAMPLE 7

Reaction and purification were conducted under the same condition as in Example 5, except that 20.75 g of 2-aminoethane thiol was used and reaction was continued for 3.5 hours. A polymer having a number average molecular weight of 11,270 was produced with a yield of 24.33%. The polymer thus obtained is hereinafter referred to as a "polymer G".

EXAMPLE 8

Reaction and purification were carried out under the same conditions as in Example 5, except that 5.04 g of 2-aminoethane thiol was applied, and reaction was conducted for 1.5 hours. A polymer having a number average molecular weight of 37,900 was produced with a yield of 18.30%. The polymer thus produced is hereinafter referred to as a "polymer H".

EXAMPLE 9

Reaction was carried out under the same conditions as in Example 5, except that 100 g of 2-hydroxyethyl methacrylate was replaced by 100 g of 2-hydroxyethyl acrylate; 13.40 g of 2-aminoethane thiol, 0.285 g of α,α'-azobisisobutyronitrile, and 328.1 g of N,N-dimethylformamide were used; and reaction was continued for 10.5 hours. The polymer produced was purified in the same manner as in Example 5, using N,N-dimethylformamide as a diluent and acetone as a solvent for reprecipitation having a volume 20 times that of the reacted mixture taken out of a reactor. A polymer having a number average molecular weight of 1,920 was obtained with a yield of 21.8%. The polymer thus produced is hereinafter referred to as a "polymer I".

EXAMPLE 10

Reaction and purification were carried out under the same conditions as in Example 9, except that 5.36 g of 2-aminoethane thiol was used, and reaction was continued for 8 hours. A polymer having a number average molecular weight of 4,780 was produced with a yield of 15.6%. The polymer thus produced is hereinafter referred to as a "polymer J".

EXAMPLE 11

Reaction and purification were undertaken under the same conditions as in Example 9, except that 4.02 g of 2-aminoethane thiol was applied and reaction was continued for 5.5 hours. A polymer having a number average molecular weight of 6,400 was obtained with a yield of 25.93%. The polymer thus produced is hereinafter referred to as a "polymer K".

EXAMPLE 12

Reaction and purification was carried out under the same conditions as in Example 9, except that 1.01 g of 2-aminoethane thiol was applied and reaction was conducted for 1.5 hours. A polymer having a number average molecular weight of 25,600 was produced with a yield of 18.16%. The polymer thus obtained is hereinafter referred to as a "polymer L".

EXAMPLE 13

Reaction was conducted under the same conditions as in Example 5, except that 100 g of 2-hydroxyethyl methacrylate was replaced by 100 g of diethylene glycol monomethacrylate; 28.57 g of 2-aminoethane thiol, 0.172 g of α,α'-azobisisobutyronitrile and 198.6 g of N,N-dimethylformamide were used; and reaction was continued for 9 hours. The polymer produced was purified in the same manner as in Example 5, using N,N-dimethylformamide as a diluent and acetone as a solvent for reprecipitation having a volume 20 times that of the reacted mixture taken out of the reactor. A polymer having a number average molecular weight of 2,830 was produced with a yield of 18.6%. The polymer thus obtained is hereinafter referred to as a "polymer M".

EXAMPLE 14

Reaction and purification were carried out under the same conditions as in Example 5, except that 2-aminoethane thiol was replaced by 48.46 g of N-methyl-2-aminoethane thiol, and reaction was continued for 8.5 hours. A polymer having a number average molecular weight of 2,500 was produced with a yield of 16.0%. The polymer thus obtained is hereinafter referred to as a "polymer N".

III. PRODUCTION OF BLOCK COPOLYMERS

EXAMPLE 15

100 g of a chlorobenzene solution containing 7.1% by weight of the polymer E and 74.3 g of a N,N-dimethylformamide solution containing 7.1% by weight of the polymer A were mixed. The mixture was reacted for 48 hours at 0° C. Before the reaction, the ratio of the number of isocyanate groups to that of amino groups present was set at about 1:1, and the total concentration of the functional groups was chosen to be 0.02 M/l.

The reacted solution was diluted with methanol and taken out of a reactor. The reacted solution was dripped into a solvent of ethyl ether having a volume 20 times that of the reacted solution to precipitate the reacted mixture, followed by filtration and drying. The reacted mixture thus recovered was added to ethyl Cellosolve, and was thermally dissolved at 50° C. The mass was cooled to 0° C., thereby separating out the unreacted polymer E and a block copolymer both insoluble at a low temperature. Thereafter, the mass was slowly heated up to 25° C. At this temperature the block copolymer was dissolved. Thereafter the precipitated polymer E was separated by a centrifuge rotated at 5,000 to 15,000 r.p.m. After the centrifugal operation, the upper clear liquid of the mass was again slowly cooled to 0° C. to precipitate out the block copolymer. The unreacted polymer A still dissolved at this temperature was separated by a centrifuge rotated at 15,000 r.p.m., thereby recovering the precipitated block copolymer.

The above-mentioned separation process was carried out twice. The finally produced precipitate was taken out in a state redissolved in methanol. The redissolved precipitant was dripped into a solvent of ethyl ether having a volume 20 times that of the redissolved precipitate to separate out the block copolymer, followed by filtration and vacuum drying. As a result, a block copolymer having a number average molecular weight of 12,700 was obtained with a yield of 76%.

10% or more of the block copolymer thus produced was dissolved in water. This block copolymer did not indicate cloud point up to 50° to 60° C., and proved to have good bio-compatibility. This product is hereinafter referred to as a "block copolymer A".

EXAMPLES 16 TO 22

Reaction and purification were carried out under the same conditions as in Example 5, except for the data given in Table 1 below. As a result, there were produced block copolymers B-H having the properties and number average molecular weights shown in Table 2 below.

TABLE 1

| Example No. | Isocyanate-terminated Polymer | | | Amino-terminated Polymer | | | Total concentration of functional groups (M/l) |
|---|---|---|---|---|---|---|---|
| | Polymer | Concentration (wt %) | Solution (g) | Polymer | Concentration (wt %) | Solution (g) | |
| 16 | C | 5.0 | 100 | F | 5.0 | 20.6 | 0.002 |
| 17 | B | 5.0 | 100 | G | 5.0 | 265 | 0.2 |
| 18 | A | 7.1 | 100 | H | 7.1 | 1,020 | 0.02 |
| 19 | A | 7.1 | 100 | I | 7.1 | 51.5 | 0.02 |
| 20 | C | 5.0 | 100 | K | 5.0 | 25.4 | 0.002 |
| 21 | B | 5.0 | 100 | M | 5.0 | 660 | 0.2 |
| 22 | A | 1.1 | 100 | N | 7.1 | 68.6 | 0.02 |

TABLE 2

| Block copolymer | Number average molecular weight | Yield (%) | Property | |
|---|---|---|---|---|
| | | | With respect to water | Bio-compatibility with a living organism |
| B | 60,800 | 74 | Water-soluble | Good |
| C | 23,400 | 82 | Highly water-swellable | Good |
| D | 82,300 | 73 | Highly water-swellable | Good |
| E | 9,800 | 86 | Water-soluble | Good |
| F | 63,200 | 74 | Water-soluble | Good |
| G | 6,510 | 76 | Highly water-swellable | Good |
| H | 12,580 | 78 | Water-soluble | Good |

A block copolymer prepared by the method of this invention has passed the test for the presence of heavy metals, exudation test, acute toxicity test, intradermal reaction test, test for the presence of pyrogenic substances, hemolysis test and implantation test all carried out pursuant to the method of testing a blood transfusion plastics vessel specified by the Japanese Pharmacopoea.

The subject block copolymers contain locally disposed hydrophilic and hydrophobic domains. The water-soluble type of the block copolymers is applicable in the form of an aqueous solution as a plasma expander, hemolysis inhibitor, or blood plasma component-fractionizing agent by being mixed with a blood plasma-producing agent or in the state of a simple substance.

The highly water-swellable type of the subject block copolymer can be shaped by molding or casting from its solution followed by removal of the solvent. When the solvents having different degree of solubility for the respective molecular chains are used, each block chain associates intermolecularly. Therefore, the block copolymer cast from the solution retains the same molecular form as in the solution, thereby displaying prominent bio-compatibility. A tube formed of the highly water-swellable block copolymer retaining said molecular form is applicable as an artificial blood vessel. A film prepared from such block copolymer can be used as an artificial skin.

Further, the block copolymer of this invention, whether water-soluble, or highly water-swellable, is applicable as a covering for the surface of a medical instrument.

What we claim is:

1. A block copolymer having hydrophilic and hydrophobic blocks expressed by the general formula:

where $R_1$ is a divalent hydrocarbon group; $R_2$ is hydrogen atom or methyl group; $R_3$ is a divalent hydrocarbon-based group; $X_1$ is a polymeric acrylic acid derivative represented by the formula:

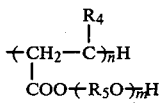

$R_4$ is hydrogen atom or an alkyl group having 1 to 4 carbon atoms; m is an integer of 1 to 10; $R_5$ is an alkylene group having 2 to 10 carbon atoms when m is 1 or an alkylene group having 2 or 3 carbon atoms when m is 2 to 10; n is an integer of 10 to 500; $X_2$ is a polyalkylene oxide represented by the formula:

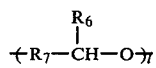

$R_6$ is hydrogen atom or an alkyl group having 1 to 4 carbon atoms; $R_7$ is an alkylene group having 1 to 3 carbon atoms; and l is an integer of 10 to 1,100.

2. The block copolymer according to claim 1, wherein m denotes an integer of 1.

3. The block copolymer according to claim 1, wherein m represents an integer of 2 to 10.

4. The block copolymer according to claim 1, wherein $R_4$ is hydrogen atom.

5. The block copolymer according to claim 1, wherein $R_4$ is methyl group.

6. The block copolymer according to claim 1, wherein $R_1$ is an aliphatic hydrocarbon group.

7. The block copolymer according to claim 1, wherein $R_1$ is an alicyclic hydrocarbon group.

8. The block copolymer according to claim 1, wherein $R_1$ is an aromatic hydrocarbon group.

9. The block copolymer according to claim 1, wherein $R_2$ is hydrogen atom.

10. The block copolymer according to claim 1, wherein $R_2$ is methyl group.

11. The block copolymer according to claim 1, wherein $R_3$ is an aliphatic hydrocarbon group.

12. The block copolymer according to claim 1, wherein $R_3$ is an aromatic hydrocarbon group.

13. The block copolymer according to claim 1, wherein the polyalkylene oxide is derived from a glycol selected from the group consisting of polyethylene glycol, polypropylene glycol, polybutylene glycol, polypentylene glycol and polyhexylene glycol.

14. A method of producing a block copolymer having hydrophilic and hydrophobic blocks expressed by the general formula:

$$HX_1-SR_1-\underset{\underset{R_2}{|}}{N}CONHR_3NHCOOX_2CONHR_3NHCON-R_1S-X_1H;$$

comprising reacting in an organic solvent free from active hydrogen an amino-terminated polymer having an amino group at one chain end, represented by the formula:

$$H(CH_2-\underset{\underset{COO(R_5O)_{\overline{m}}H}{|}}{\overset{R_4}{C}})_{\overline{n}}SR_1\underset{\underset{}{|}}{\overset{R_2}{N}}H$$

with an isocyanate-terminated polymer having an isocyanate group at both chain ends, represented by the formula:

$$OCNR_3NHCOO(R_7-\underset{\underset{}{|}}{\overset{R_6}{C}}H-O)_{\overline{l}}OCNHR_3NCO,$$

said amino-terminated polymer being produced by polymerizing an α-substituted acrylic acid hydroxy ester of the formula:

$$CH_2=CR_4$$
$$COO(R_5O)_{\overline{m}}H$$

using a chain transfer agent of aminothiol of the formula:

$$\underset{\underset{}{|}}{\overset{R_2}{N}}H-R_1-SH$$

said isocyanate-terminated polymer being prepared by reacting a polyalkylene glycol of the formula:

$$HO(R_7-\underset{\underset{}{|}}{\overset{R_6}{C}}H-O)_{\overline{l}}H$$

with a diisocyanate of the formula:

$$OCN-R_3-NCO$$

where $R_1$ is a divalent hydrocarbon group; $R_2$ is hydrogen atom or methyl group; $R_3$ is a divalent hydrocarbon-based group; $X_1$ is a polymeric acrylic acid derivative represented by the formula:

$$(CH_2-\underset{\underset{COO(R_5O)_{\overline{m}}H}{|}}{\overset{R_4}{C}})_{\overline{n}}H$$

$R_4$ is hydrogen atom or an alkyl group having 1 to 4 carbom atoms; m is an integer of 1 to 10; $R_5$ is an alkylene group having 2 to 10 carbon atoms when m is 1 or an alkylene group having 2 or 3 carbon atoms when m is 2 to 10; n is an integer of 10 to 500; $X_2$ is a polyalkylene oxide represented by the formula:

$$(R_7-\underset{\underset{}{|}}{\overset{R_6}{C}}H-O)_{\overline{l}}$$

$R_6$ is hydrogen atom or an alkyl group having 1 to 4 carbon atoms; $R_7$ is an alkylene group having 1 to 3 carbon atoms; and l is an integer of 10 to 1,100.

15. The method according to claim 14, wherein the polyalkylene glycol and diisocyanate are reacted together in a molar ratio of about 1:2.

16. The method according to claim 15, wherein the polyalkylene glycol and diisocyanate are reacted together in an organic solvent, with the total concentration of the hydroxyl groups and isocyanate groups chosen to be 0.002 to 0.2 M/l.

17. The method according to claim 16, wherein the polyalkylene glycol and diisocyanate are reacted together at a temperature of 60° to 120° C.

18. The method according to claim 16, wherein the polyalkylene glycol and diisocyanate are reacted together at a temperature of 80° to 90° C.

19. The method according to claim 15, wherein the polyalkylene glycol is selected from the group consisting of polyethylene glycol, polypropylene glycol, polybutylene glycol, polypentylene glycol and polyhexylene glycol.

20. The method according to claim 15, wherein the diisocyanate is selected from the group consisting of aliphatic diisocyanates and aromatic diisocyanates.

21. The method according to claim 14, wherein the acrylic acid hydroxy ester is polymerized at a temperature of 50° to 200° C.

22. The method according to claim 14, wherein the acrylic acid hydroxy ester is polymerized at a temperature of 55° to 150° C.

23. The method according to claim 21, wherein the chain transfer agent is used in an amount of 1 to 100 parts by weight per 100 parts by weight of the acrylic acid hydroxy ester.

24. The method according to claim 21, wherein the acrylic acid hydroxy ester is 2-hydroxyethyl acrylate or 2-hydroxyethyl methacrylate.

25. The method according to claim 21, wherein the chain transfer agent is 2-aminoethane thiol.

26. The method according to claim 14, wherein the isocyanate-terminated polymer and the amino-terminated polymer are reacted together in such proportions that the ratio between the number of the isocyanate groups and that of the amino group is set at about 1:1.

27. The method according to claim 26, wherein the isocyanate-terminated polymer and the amino-terminated polymer are reacted together with the total concentration of the isocyanate groups and the amino groups chosen to be 0.002 to 0.2 M/l solvent.

28. The method according to claim 14, wherein the isocyanate-terminated polymer and the amino-terminated polymer are reacted together at a temperature of −10° to 15° C.

29. The method according to claim 14, wherein the isocyanate-terminated polymer and the amino-terminated polymer are reacted together at a temperature of 0° to 10° C.

30. Bio-compatible medical materials comprising a block copolymer having hydrophilic and hydrophobic blocks expressed by the general formula:

where $R_1$ is a divalent hydrocarbon group; $R_2$ is hydrogen atom or methyl group; $R_3$ is a divalent hydrocarbon-based group; $X_1$ is a polymeric acrylic acid derivative represented by the formula:

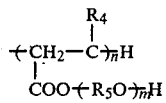

$R_4$ is hydrogen atom or an alkyl group having 1 to 4 carbon atoms; m is an integer of 1 to 10; $R_5$ is an alkylene group having 2 to 10 carbon atoms when m is 1 or an alkylene group having 2 or 3 carbon atoms when m is 2 to 10; n is an integer of 10 to 500; $X_2$ is a polyalkylene oxide represented by the formula:

$$+R_7-\underset{\underset{R_6}{|}}{C}H-O+_l$$

$R_6$ is hydrogen atom or an alkyl group having 1 to 4 carbon atoms; $R_7$ is an alkylene group having 1 to 3 carbon atoms; and l is an integer of 10 to 100.

* * * * *